US008435582B2

(12) United States Patent
Smith

(10) Patent No.: US 8,435,582 B2
(45) Date of Patent: May 7, 2013

(54) BEVERAGE PRESERVATIVE SYSTEM CONTAINING PIMARICIN-POVIDONE COMPLEX

(75) Inventor: Richard T. Smith, Ridgefield, CT (US)

(73) Assignee: PepsiCo, Inc., Purchase, NY (US)

(\*) Notice: Subject to any disclaimer, the term of this patent is extended or adjusted under 35 U.S.C. 154(b) by 278 days.

(21) Appl. No.: 12/791,912

(22) Filed: Jun. 2, 2010

(65) Prior Publication Data

US 2010/0310722 A1   Dec. 9, 2010

Related U.S. Application Data

(60) Provisional application No. 61/183,577, filed on Jun. 3, 2009.

(51) Int. Cl.
*A21D 4/00* (2006.01)

(52) U.S. Cl.
USPC ........ 426/335; 426/330.3; 426/519; 426/532; 426/654; 514/31

(58) Field of Classification Search .................... 426/335
See application file for complete search history.

(56) References Cited

U.S. PATENT DOCUMENTS

| 5,738,888 A * | 4/1998 | Cirigliano et al. .............. 426/52 |
| 5,773,062 A | 6/1998 | Cirigliano et al. |
| 5,895,680 A | 4/1999 | Cirigliano et al. |
| 5,895,681 A | 4/1999 | Cirigliano et al. |
| 5,993,889 A | 11/1999 | Nakada et al. |
| 6,132,787 A | 10/2000 | Bunger et al. |
| 6,146,675 A * | 11/2000 | Cirigliano et al. ......... 426/330.6 |
| 6,156,362 A | 12/2000 | Cirigliano et al. |
| 6,228,408 B1 | 5/2001 | Van Rijn et al. |
| 6,383,471 B1 | 5/2002 | Chen et al. |
| 2002/0044968 A1 | 4/2002 | Van Lengerich |
| 2006/0047069 A1 | 3/2006 | Jakob et al. |
| 2006/0073249 A1 * | 4/2006 | Haan et al. ..................... 426/335 |
| 2006/0105045 A1 | 5/2006 | Buchannan et al. |
| 2006/0241061 A1 | 10/2006 | Stark et al. |
| 2007/0065547 A1 | 3/2007 | Coyne et al. |
| 2007/0141096 A1 | 6/2007 | Van Lengerich |
| 2008/0044530 A1 | 2/2008 | McCormick et al. |
| 2009/0011009 A1 | 1/2009 | Benita et al. |

FOREIGN PATENT DOCUMENTS

| EP | 0 466 038 | 1/1992 |
| WO | 2004/082407 | 9/2004 |
| WO | 2006/135854 | 12/2006 |

OTHER PUBLICATIONS

International Search Report received for PCT/US2010/036865 mailed Aug. 13, 2010.

\* cited by examiner

*Primary Examiner* — Patricia George
(74) *Attorney, Agent, or Firm* — Banner & Witcoff, Ltd.

(57) ABSTRACT

The present invention provides a beverage preservative system comprising a Pimaricin-providone complex for use in beverages products. The present invention is further directed to beverage products comprising the beverage preservative systems. The beverage preservative system prevents spoilage by microorganisms in a beverage within a sealed container for a period of at least 16 weeks.

14 Claims, No Drawings

BEVERAGE PRESERVATIVE SYSTEM CONTAINING PIMARICIN-POVIDONE COMPLEX

RELATED APPLICATIONS

This application claims priority to U.S. Ser. No. 61/183,577, filed Jun. 3, 2009, which is hereby incorporated by reference in its entirety.

TECHNICAL FIELD

This invention relates to beverage preservative systems and beverage products comprising the preservative system. In particular, this invention relates to beverage preservative systems having formulations suitable to meet consumer demand for healthy and environmentally friendly ingredients.

BACKGROUND

Many food and beverage products include chemical preservatives to extend the shelf-life of the product by inhibiting the growth of spoilage microorganisms (e.g., mold, yeast, bacteria). However, some preservatives currently in use have been characterized as either a detriment to one's health, a threat to the environment, or as insufficiently stable. Therefore, there is market demand for food and beverage products which do not include these detrimental preservatives, and yet still possess extended shelf-life.

For example, benzoic acid and its salts are commonly used in beverage products as preservatives. However, in some beverage formulations that possess vitamin C and a relatively high pH, a small fraction of benzoic acid and its salts is prone to conversion into benzene (ppb quantities). Heat and certain wavelengths of light increase the rate of this reaction, so extra care need be taken in the production and storage of beverage such products when both benzoate and ascorbic acid are ingredients. Intake of benzene in drinking water is a public health concern, and the World Health Organization (WHO) and several governing bodies within the United States and the European Union have set upper limits for benzene content in drinking water of 10 ppb, 5 ppb, and 1 ppb, respectively.

Ethylenediamine tetraacetic acid (EDTA) and its salts are also common beverage product preservative. EDTA sequesters metal ions and can impact their participation in any number of chemical reactions. At elevated concentrations, EDTA can serve to starve bacteria of needed trace elements. At relatively low concentrations as typically found in beverage, EDTA facilitates the activity of at least weak acid preservatives such as sorbic and benzoic acid. However, EDTA is not bio-degradable, nor is it removed during conventional wastewater treatment. EDTA has surfaced as environmental concerns predominantly because of its persistence and strong metal chelating properties. Widespread use of EDTA and its slow removal under many environmental conditions have led to its status as the most abundant anthropogenic compound in many European surface waters. River concentrations of EDTA in Europe are reported in the range of 10-100 μg/L, and lake concentrations of EDTA are in the range of 1-10 μg/L. EDTA concentrations in U.S. groundwater receiving wastewater effluent discharge have been reported in the range of 1-72 μg/L, and EDTA was found to be an effected tracer for effluent, with higher concentrations of EDTA corresponding to a greater percentage of reclaimed water in drinking water production wells.

Polyphosphates are another type of sequestrant employed as a beverage product preservative. However, polyphosphates are not stabile in aqueous solution and degrade rapidly at ambient temperature. Degradation of polyphosphates results in unsatisfactory sensory issues in the beverage product, such as change in acidity. Also, the shelf-life of the beverage product can be compromised as the concentration of polyphosphate deteriorates.

It is therefore an object of the present invention to provide new preservative systems for use in beverages as replacements for at least one currently used preservative that has detrimental health and/or environmental effects, or lack of sufficient stability. It is further an object of the invention to provide new beverage preservative systems with improved sensory impact. It is further an object of the invention to provide preservative systems without benzoic acid and/or reduced concentrations of sorbic acid. Some countries have regulatory restrictions on the use of sorbic acid in food and beverage products wherein the permitted concentration is less than is required to inhibit the growth of spoilage microorganisms.

SUMMARY

According to an aspect of the invention, a beverage preservative system is provided which comprises: a Pimaricin-Povidone complex; wherein the preservative system prevents spoilage by microorganisms in a beverage within a sealed container for a period of at least 16 weeks.

According to another aspect of the invention, a beverage product is provided which comprises: a beverage component; a Pimaricin-Povidone complex wherein the beverage has a pH of 2.5 to 7.5; and the beverage when placed within a sealed container is substantially not spoiled by microorganisms for a period of at least 16 weeks. In accordance with a further aspect, the beverage is a high acid beverage having a pH of about 2.5 to about 5.6, or about 2.5 to about 4.6.

According to one aspect of the invention, a beverage preservative system is provided which comprises: a Pimaricin-Povidone complex and DMDC wherein the beverage preservative system prevents growth of spoilage microorganisms in a beverage contained by a package and seal (closure) for a period of at least 16 weeks. Another aspect of the invention is directed to a beverage containing the beverage preservative system comprising a Pimaricin-Povidone complex and DMDC.

According to one aspect of the invention, a beverage preservative system is provided which comprises: a Pimaricin-Povidone complex and a sequestrant, wherein the beverage preservative system prevents growth of spoilage microorganisms in a beverage contained by a package and seal (closure) for a period of at least 16 weeks. Another aspect of the invention is directed to a beverage containing the beverage preservative system comprising a Pimaricin-Povidone complex and a sequestrant.

These and other aspects, features, and advantages of the invention or of certain embodiments of the invention will be apparent to those skilled in the art from the following disclosure and description of exemplary embodiments.

DETAILED DESCRIPTION

The present invention is directed to a preservative system particularly suited for beverages having a pH no greater than pH 7.5 wherein the beverage is preserved for a period of at least 16 weeks. The preservative system comprises a Pimaricin-Povidone complex.

The present invention is particularly effective in preventing spoilage of beverages that can be initiated by either vegetative mold hyphae or spores of molds that are capable of germinating to a vegetative form when suspended in a beverage. Fungi forms that are inhibited by the preservative system include yeast, mold and dimorphic forms of fungi such as occurs in *Yarrowia, Candida* and, possibly, *Brettanomyces*. Mold spores may not be inactivated by the presence of the preservative system invention, but the spores are either prohibited from germinating in the presence of the invention or the vegetative form of the mold that results upon germination is prohibited from growth beyond a small number of cell cycle replications.

Pimaricin is a natural bio-active compound that serves to prohibit the growth of yeast and mold fungi. Prior to this invention, the limits of solubility and stability of Pimaricin in aqueous systems prohibited the use of this antimicrobial in the role of beverage preservative. In and of itself, Pimaricin is able to enter into solution with water at a final concentration of 52 mg/L (25° C.). This is at least 5 fold less than the amount of Pimaricin that must be added, in and of itself, to a beverage in order to prohibit the outgrowth of mold fungi for a period of 16 weeks, the limit of product shelf life. Moreover, the presence of other ingredients, such as sugars and organic acids, further impedes the ability of Pimaricin to enter solution. Only the amount of Pimaricin that is in solution can act as a preservative. The notable formation of a precipitate of Pimaricin in a system (beverage) is a clear indication that the ability of Pimaricin to inhibit growth of mold has been compromised. Thus products containing complex-free Pimaricin in the form of a precipitate are not stable for the whole period of the shelf life requirement.

The present invention is based on the discovery that Pimaricin may be combined with a substance that serves to increase the solubility of Pimaricin, without measurably impairing the activity of Pimaricin. The limit of solubility of Pimaricin in water (25° C.) is approximately 52 mg per liter solution, but an association between Pimaricin and Povidone permits Pimaricin to remain in solution to at least 150 mg per liter, even at temperatures found in refrigerated display cases (8-10° C.). Further, Pimaricin, when in complex with Povidone, is maintained in solution in a form that does not precipitate and without loss of antimicrobial activity. Thus, the quality attributes of the product are maintained. The stabilization of product for a period of 16 weeks without compromise to quality attributes of product measurably differentiates the application of this invention from other methods of deploying Pimaricin as a beverage preservative. The minimum initial concentration of Pimaricin needed to preserve product for a period of 16 weeks is 280 mg Pimaricin per liter when Pimaricin is employed as the only antimicrobial substance (stand alone). Supplementing the beverage with adjunct preservative substances permits the use of lower concentrations of (for example 100-150 mg/L) Pimaricin in the form of a complex with Povidone. Wherein neither Povidone-Pimaricin complex or adjunct preservatives by themselves are able to prohibit spoilage, the mixture of Povidone-Pimaricin complex and adjunct preservative is particularly effective.

Sodium (Na+) and Chloride (Cl−) when present is specific ratios are known to interact in a manner which results in the formation of salt (sodium chloride), a substance that possesses chemical and physical characteristics different than either of its components. Similarly, Pimaricin and Povidone, when present in appropriate ratio and concentration, will spontaneously interact in a manner that yields a clathrate, a complex, or a structure that shares characteristics of both a clathrate and a complex. The clathrate-complex possesses chemical and physical attributes that are distinct from its two components. As such, the chemical structure of Povidone-Pimaricin is distinct from a Pimaricin alone.

Also, the interaction between Povidone and Pimaricin is different than occurs between a surfactant (solubilizer) where in the interaction between "guest" and "host" results in a micelle encapsulate. Here, hydrophobic interactions dictate that the guest will be largely buried in the hydrophobic center of the micelle. When complexed with Povidone, Pimaricin is still accessible to the bulk solution and to the surface of the microorganism.

The literature is quite clear that antimicrobial agents encapsulated or embedded in micelles or emulsions are generally un-accessible to microorganisms suspended in bulk aqueous phase.

Summarizing, Pimaricin is therefore a natural bio-active component that serves to prohibit the growth of yeast and mold fungi and the Povidone serves to maintain a relatively uniform distribution of the Pimaricin throughout the total volume occupied by the beverage. The term "relatively uniform distribution" means homogenous as established by the classical or traditional analytical chemistry methods. The bio-active component can be thought of as a "guest" and the agent that serves to maintain uniform distribution of the guest is the "host". A guest may interact with a host in one of two ways. When an association evolves because of a charge transfer or the formation of a co-ordinate covalent bond, the association is referred to as a complex. In the instance where the guest simply fits neatly into a cavity provided by the host, the association is a clathrate. The majority of guest host associations are a combination of both phenomena. From this point forward, the term complex will be employed to in place of clathrate-complex. The complex is distinct from encapsulations. The nature of the complex between Povidone and Pimaricin is more in keeping with the type of complexes formed between hydrotropes and relatively insoluble organic solutes. As opposed to encapsulation, the solute is relatively free to exit the complex with the hydrotrope and then interact with the surface of the microorganism. A hydrotrope is generally understood to be an organic substance that, when present in measurable excess relative to an organic solute, enhances the solubility of organic solute. The ratio of hydrotrope to organic solute is typically in excess of 1:1. However the ratio of hydrotrope to solute does not approach the ratio of encapsulant to solute in encapsulant systems. Also, the complex between Povidone and Pimaricin is chemically distinct from 1:1, 1:2, 2:2 type complexes that are generally more common (as in the instance of NaCl). For instance, the complex between Pimaricin and Povidone is a different type of complex than occurs between cyclodextrins and various "guest molecules where the ratio of cyclodextrin to guest is typically 1:1 1:2 or 2:1."

Another common name for Pimaricin is Natamycin. The IUPAC systematic name for natamycin is (IR, 3S, 5R, 7R, 8E, 12R, 14E, 16E, 18E, 20E, 22R, 24S, 25R, 26S)-{[3S, 4S, 5S, 6R)-4-amino-3,5-dihydroxy-6-methyloxan-2-yl]oxy}-1,3, 26 trihydroxy-12-methyl-10-oxo-6,11,28-trioxatricyclo [22.3.1.0$^{5,7}$]octacosa-8,14,16,18,20 pentaene-25-carboxylic acid. A second rendition of the IUPAC name for the Pimaricin ($C_{33}H_{47}NO_{13}$) is 22-[(3 amino-3,6-dideoxy-B-D-mannopyranosyl)-oxy]-1,3,26-trihydroxy-12-methyl-10-oxo-6,11, 28-trioxatricyclo [22.3.1.0$^{5,7}$]octacosa-8,14,16,18,20 pentaene-25-carboxylic acid. Pimaricin has been assigned the CAS number 7681-93-8. It is approved for use in at least some foods (for instance, European food additive number is E235 (preservative) and E1201 (stabilizer) and the recommended ADI is 0-0.3 mg/kg of body weight.

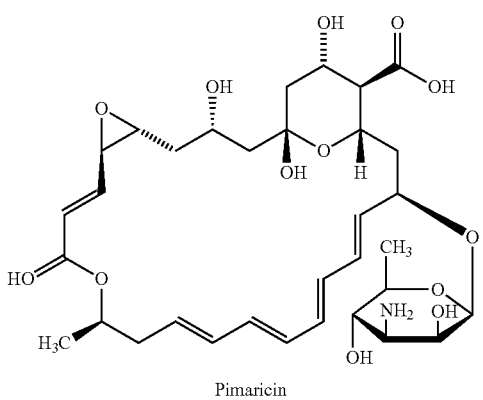

Pimaricin

Pimaricin is an effective antifungal agent (yeast and mold) and it has limited approval for use in foods. The compound functions through an interaction with fungal steroid known as ergosterol, a substance present only in fungi. Consequently, Pimaricin has not proven toxic in whole animal or tissue culture studies. Additionally, the degradation products of Pimaricin are shown to be non-toxic. The degradation products of pimaricin do not differ significantly from the degradation products of cholesterol. Degradation, if it occurs at all, is not driven measurably by temperature.

Pimaricin is a white, tasteless, and odorless compound. The antimicrobial activity is stable to short exposures of 120° C. and does not decompose at a measurable rate unless temperatures exceed 180° C.

Unfortunately, as noted above, Pimaricin is not particularly soluble in aqueous solutions. It demonstrates solubility in pure water (25° C.) of only 0.052 mg/ml (52 mg/L,) where Pimaricin itself drives a pH is estimated to be approximately 6.4 (Pimaricin, possesses a single carboxylic group that drives the acidic pH value).

The presence of other solute components (sugars, vitamins, etc) and a pH other than 6.4 will impact solubility, generally in an unfavorable manner. For instance, test results indicate a solubility limit of only 20 mg/L Pimaricin at 25° C. pH 3.4 and 10 mg/L at 4° C. and pH 3.4 in a 12 Brix apple juice beverage. Pimaricin is not sufficiently soluble in beverage to function as a beverage preservative in and of itself. Furthermore, at the natural limit of solubility for Pimaricin, it cannot function additively with other preservative substances given the physical, sensory or regulatory limits on use of these adjunct antimicrobial agents. For instance, cinnamic acid is a particularly good adjunct preservative if it can be employed at concentrations below 30 mg/L where the impact on taste can be mitigated. 30 mg/L cinnamic acid in combination with 10 pmg/Lpm Pimaricin is not an effective preservative combination. However, 30 mg/L cinnamic acid combined with even 65 mg/L Pimaricin is measurably effective.

Further, it may be necessary to employ a relatively high initial concentration of Pimaricin in order to compensate for degradation that occurs when Pimaricin is exposed to UV light. Otherwise stated, it may be necessary to introduce Pimaricin at an initial concentration that slightly exceeds the minimum concentration required to inhibit growth (in the absence of UV light) in order to ensure a sufficient quantity of Pimaricin throughout the life of the product. The degradative components of Pimaricin are not toxic and are also not inclined to change the sensory attributes of the product. This issue can also be addressed by deployment of UV blockers or UV absorbing substances in the beverage.

The other component of the complex is Povidone (polyvinylpyrrolidone) (CAS 9003-39-8) Other formal names include 1-ethenyl-2-pyrrolidon homopolymer, poly[1-(2-oxo-1-pyrrolidnyl)ethylene], CrosPovidone and 1-vinyl-2-pyrrolidinon-polymere). Abbreviations and other commonly employed names include PNVP, Povidone, and polyvidone). Povidone is a polymer of vinylpyrrolidone. As such, it can be made to various lengths through addition of successive monomer units. Typically, a preparation of Povidone will possess a mixture of polymers of slightly different lengths wherein an average length and a range of length can be established through analytical methods. It is common to find commercial preparations that are characterized by different average length or different range of lengths or both expressed in terms of range of molecular weight.

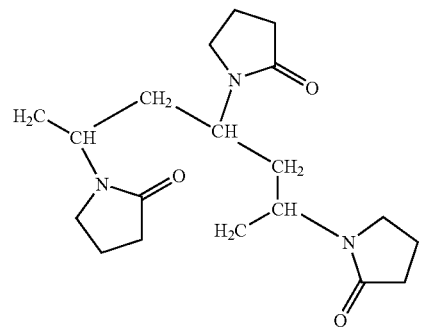

Povidone

Povidone is referred to as a suspending material or agent. Povidone also appears to possess characteristics of substances known as hydrotropes. As such, Povidone can be employed as a vehicle for extending the limit of solubility of a number of compounds and drugs. The phrase "extending the limit of solubility" is meant to mean that the upper limit of solubility has been increased for a substance that is entered into a solution which is predominately composed of water (aqueous system). Solubility can be expressed in grams per liter, moles per liter, or mole fraction. A liter of pure water possesses a concentration of water equal to 55.5 moles per liter or 1000 g/L. Water remains the principle component in a beverage even after substituting beverage ingredients for some amount of water.

However, it is difficult to predict whether Povidone can be employed to extend the solubility of a bio-active substance without compromise to the bio-activity. Although solubility extenders may improve solubility of an active compound, they may impair the activity of the active compound rendering such compound ineffective. Further, the components of a beverage may displace Pimaricin from the complex with Povidone resulting in a precipitate.

Beverage formulations will be made to contain an initial concentration of Pimaricin of at least 25 mg/L, at least 50 mg/L, or at least 75 mg/L, to at most 250 mg/L, at most 200 mg/L, at most 150 mg/L, such as 25 to 250 mg/L, 50 to 200 mg/L, 75 to 150 mg/L. One aspect of the invention is directed to a beverage preservative system comprising Pimaricin at a concentration of at least 100 mg/L which is obtainable because of the complex formed with polyvinylpyrrolidone (Povidone). This targeted initial concentration will compensate for degradation that can occur in the absence of UV blockers or UV absorbing beverage components. For instance, fortified water beverages will not likely contain UV absorbing substances that can protect. The pH of beverages with relatively low pH allows lower concentrations of Pimaricin to be employed, even when complexed with PVP. (Lower range solubility of PVP-complex at pH 3.4 is 80 mg/L and lower range solubility of PVP-Pimaricin complex at pH>4.0 is 150 mg/L). Between pH 3.4 and higher pH values there is a linear gradation of allowable concentrations of PVP-Pimaricin. Except for the impact of pH on solubility, the activity of Pimaricin is measurably independent of pH.

Mouth feel is an important aspect of beverage formulation. Another aspect of the invention is to enhance the sensory aspect of certain beverages through adjustment to "mouth feel". The approximate weight percent of Pimaricin relative to the overall complex is >0.3% w/w. (0.25-0.3 g of Pimaricin per 100 g of complex). Consequently, the addition of 33 g of complex to 1 liter volume of beverage (as way of example) will yield an initial concentration of Pimaricin equal to 82.5 mg Pimaricin/Liter. The anticipated viscosity of a solution containing a 33 g Povidone-Pimaricin complex is in the range of 2-4 mPa·sec. This viscosity (3 cps) approximates the viscosity of a beverage containing 1-3% Gum Arabic. Such a formulation has the added benefit of enhanced "mouth feel". Orange Juice at 25° C. possesses a viscosity of about 20 cps (4° C.).

In addition to the Pimaricin-Povidone complex, dimethyl dicarbonate may be included in the present preservative formulation.

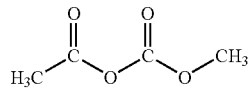

Dimethyl dicarbonate is effective only toward bacterial and fungal organisms that are in the vegetative state. Dimethyl dicarbonate is not active against the spore state of organisms. Many types of spoilage organisms are able to convert between vegetative and spore states. Spores are dormant structures consisting of a hardened coat that encompass the specific remnants of the vegetative-state which required for the organism to re-instate growth (germination). The spore state offers protection from chemical and physical agents that are lethal to vegetative forms.

DMDC is subject to rapid decomposition in aqueous systems, and the rate of degradation is so fast that there is no chance for the action of residual DMDC on mold spores as such spores generally begin to germinate 1 to 2 hours after becoming exposed to the beverage (spores that are contaminants by virtue of the association with food contact surfaces of the packaging materials). Thus, DMDC cannot be employed as a stand alone preservative because it is inactive against mold spores and it dissipates before it can act on any spores that germinate in product.

The manufacturer of DMDC reports that the concentration of DMDC required to stabilize beverage for a period of 16 weeks against the outgrowth of vegetative forms of yeast, mold, and bacteria is at least 250 mg/liter. This is the legal limit for use inside of the U.S. In the present invention, DMDC is used at a concentration of between about 75 mg/L and 250 mg/L, generally between about 100 mg/L and about 200 mg/L.

It should be noted that Pimaricin is relatively tolerant to short exposures to heat and that it is fully within the scope of the invention to employ Pimaricin-Povidone complex in conjunction with a thermal process. Following a thermal process that destroys vegetative forms of fungi and bacteria, Pimaricin would be present to address the consequences of mold spore germination. Typically, a thermal process of 2 minutes at 140° F. is sufficient to provide product that is commercially sterile relative to bacteria, vegetative yeast and mold. The standard fill temperature for hot-fill into PET is 85° C. (185° F.). Pimaricin does not degrade until the temperature exceeds 280° C. (536° F.).

Aspects of the invention are directed to preserve a broad range of beverage products against spoilage by yeast, mold and a range of acid tolerant bacteria. The beverage products possess a pH of up to 7.5, in particular up to 5.6, such as 2.5 to 5.6, 2.5 to 4.6, or 2.6 to 3.8. Preservation of product can be accomplished merely through the addition of the chemical agents described herein, but it is also possible to supplement the action of the chemicals with purely physical forms of preservation such as alteration of product temperature, various wavelengths of irradiation, pressure or combinations thereof.

The pH of the preservative system in and of itself is not particularly relevant. Only a very small amount will be added to beverage and the pH of the beverage will dominate. The pH of the beverage containing the preservative system can be adjusted to any specified value.

The Povidone-Pimaricin complex can be complemented by the presence of other substances known to possess antimicrobial activity. Combining two or more antimicrobial substances into a single formulation allows for the possibility of a "multiple hurdle effect" wherein multiple metabolic processes are inhibited to a degree that the organism is unable to grow and reproduce. Substances such as sequestrants, organic acids and phenolic compounds, such as terpenes, can be employed with Pimaricin.

The beverage preservative system may further comprise sorbic acid, cinnamic acid, salt of cinnamic acid, or a mixture of sorbic and cinnamic acid, alkali salts of sorbic acid (K+, Na+) and/or alkali salts of cinnamic acid (K+, Na+) that result in specific concentrations of cinnamic or sorbic acid as determined by final beverage pH.

The beverage preservative system may further comprise a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), and mixtures thereof, and a pH of 5.8 or less; wherein the beverage preservative system prevents spoilage by microorganisms in a beverage within a sealed container for a period of at least 16 weeks.

The beverage preservative system may further comprise sodium hexametaphosphate (SHMP), sodium acid metaphosphate (SAMP), or mixture of SHMP and SAMP to a prescribed total amount. Within the pH range of 2.5 to 5.8, SAMP and SHMP can substitute for one another in a ratio of 1:1 without compromise to anti-microbial effect. Substitution of one for other is often an issue of sensory perception, particularly "mouth feel".

The beverage preservative system may further comprise phosphonate to a prescribed total amount wherein the composition contains any number of types of phosphonate structures such that a total amount of phosphonate is achieved.

The beverage preservative system may further comprise bis-phosphonate to a prescribed total amount wherein the composition contains any number of types of bis-phosphonate structures such that a total amount of bis-phosphonate is achieved.

The beverage preservative system may further comprise N-bis-phosphonate to a prescribed total amount wherein the composition contains any number of types of N-bis-phosphonate structures such that a total amount of bis-phosphonate is achieved.

In some instances of any of the embodiments describes above, EDTA may need to be present where the purpose is to stabilize chemical ingredients. When it is added for this purpose, it will fulfill the un-intended second role should it participate as an un-intended antimicrobial preservative. To fulfill the role of stabilization of chemical ingredients, EDTA need not be present in an amount greater than 30 mg/L or an amount of EDTA in place of bio-degradable sequestrants that does not exceed 45 mg/L.

In general, the beverage preservative system or beverage product of invention should have a total concentration of chromium, aluminum, nickel, zinc, copper, manganese, cobalt, calcium, magnesium, and iron cations in the range of about 1.0 mM or less, e.g., about 0.5 mM to 0.75 mM, about 0.54 mM or less. The present invention may optionally include the use water to batch product that has been treated to remove metal cations. As opposed to the teachings of U.S. Pat. No. 6,268,003, the preferred method of treatment is via physical processes reverse osmosis and or electro-deionization. Treatment by chemical means, as taught in U.S. Pat. No. 6,268,003 is acceptable, but is not preferred. The use of chemical means to reduce water hardness often results in an increase in the concentration of specific mono-valent cations, e.g., potassium cations, that serve to compromise the invention described herein. In certain exemplary embodiments, the added water has been treated by reverse osmosis, electro-deionization or both to decrease the total concentration of metal cations of chromium, aluminum, nickel, zinc, copper, manganese, cobalt, calcium, magnesium, and iron to about 1.0 mM or less.

As commonly understood in the art, the definitions of the terms "preserve," "preservative," and "preservation" do not provide a standard time period for how long the thing to be preserved is kept from spoilage, decomposition, or discoloration. The time period for "preservation" can vary greatly depending on the subject matter. Without a stated time period, it can be difficult or impossible to infer the time period required for a composition to act as a "preservative."

As used herein, the terms "preserve," "preservative," and "preservation" refer to a food or beverage product protected against or a composition able to stop or completely prevent spoilage of a product that is the result of the growth of spoilage microorganisms for a period of at least 16 weeks. This period is in keeping with the time required to transport a beverage product from location of manufacture, through distribution channels, into the hand of the consumer. Absence of spoilage is noted by absence any evidence of growth of spoilage organisms (turbidity, viable count, direct microscopic count or other standard methods of enumeration) and by the absence of any discernable change in the product attributes that could be routinely attributed to metabolism of spoilage organisms.

As used herein, the term "inhibit" is understood to mean stop or to prevent completely.

Typically, the product is preserved under ambient conditions, which include the full range of temperatures experienced during storage, transport, and display (e.g., 0° C. to 40° C., 10° C. to 30° C., 20° C. to 25° C.) without limitation to the length of exposure to any given temperature.

"Minimal inhibitory concentration" (MIC) is another term for which no standard time period is routinely defined or understood. In the medical fields, MIC is frequently employed to designate the concentration of a substance which prohibits the growth of a single type of microorganism in over-night incubation as compared to a positive control without the substance (see Wikipedia). However, the rest of the scientific community has adopted the term MIC to mean any of a number of conditions of period of incubation and degree of inhibition.

Even within the medical field, it is recognized that an MIC value developed over a period of 24 hours incubation may not be the same value developed after 48 hours or longer. Otherwise stated, a substance may exhibit an observable MIC during the first 24 hours of an experiment, but exhibit no measurable MIC relative to the positive control after 48 hours.

Beverage products according to the present invention include both still and carbonated beverages. Herein, the term carbonated beverage is inclusive of any combination of water, juice, flavor and sweetener that is meant to be consumed as an alcohol free liquid and which also is made to possess a carbon dioxide concentration of 0.2 volumes of $CO_2$ or greater. The term "volume of $CO_2$" is understood to mean a quantity of carbon dioxide absorbed into the liquid wherein one volume $CO_2$ is equal to 1.96 grams of carbon dioxide ($CO_2$) per liter of product (0.0455M) at 25° C. Non-inclusive examples of carbonated beverages include flavored seltzer waters, juices, cola, lemon-lime, ginger ale, and root beer beverages which are carbonated in the manner of soft drinks, as well as beverages that provide health or wellness benefits from the presence of metabolically active substances, such as vitamins, amino acids, proteins, carbohydrates, lipids, or polymers thereof. Such products may also be formulated to contain milk, coffee, or tea or other botanical solids. It is also possible to formulate such beverages to contain one or more nutraceuticals. Herein, a nutraceutical is a substance that has been shown to possess, minimally, either a general or specific health benefit or sense of wellness as documented in professional journals or texts. Nutraceuticals, however, do not necessarily act to either cure or prevent specific types of medical conditions.

Herein, the term "still beverage" is any combination of water and ingredient which is meant to be consumed in the manner of an alcohol free liquid beverage and which possesses no greater than 0.2 volumes of carbon dioxide. Non-inclusive examples of still beverages include flavored waters, tea, coffee, nectars, mineral drinks, sports beverages, vitamin waters, juice-containing beverages, punches or the concentrated forms of these beverages, as well as beverage concentrates which contain at least about 45% by weight of juice. Such beverages may be supplemented with vitamins, amino acids, protein-based, carbohydrate-based or lipid-based substances. As noted, the invention includes juice containing products, whether carbonated or still. "Juice containing beverages" or "Juice beverages", regardless of whether still or carbonated, are products containing some or all the components of a fruit, vegetable or nuts or mixture thereof that can either be suspended or made soluble in the natural liquid fraction of the fruit.

The term "vegetable," when used herein, includes both fruiting and the non-fruiting but edible portion of plants such as tubers, leaves, rinds, and also, if not otherwise indicated, any grains, nuts, beans, and sprouts which are provided as juices or beverage flavorings. Unless dictated by local, national or regional regulatory agencies the selective removal of certain substances (pulp, pectins, etc) does not constitute an adulteration of a juice.

By way of example, juice products and juice drinks can be obtained from the fruit of apple, cranberry, pear, peach, plum, apricot, nectarine, grape, cherry, currant, raspberry, gooseberry, blackberry, blueberry, strawberry, lemon, orange, grapefruit, passionfruit, mandarin, mirabelle, tomato, lettuce, celery, spinach, cabbage, watercress, dandelion, rhubarb, carrot, beet, cucumber, pineapple, custard-apple, coconut, pomegranate, guava, kiwi, mango, papaya, watermelon, lo han guo, cantaloupe, pineapple, banana or banana puree, lemon, mango, papaya, lime, tangerine, and mixtures thereof. Preferred juices are the citrus juices, and most preferred are the non-citrus juices, apple, pear, cranberry, strawberry, grape, papaya, mango and cherry.

The invention could be used to preserve a formulation that is essentially 100% juice but the product cannot be labeled to contain 100% juice. The invention can be used in products containing juice wherein juice concentration is below 100%. Lowering of juice concentration below 10% will typically favor the use of lowered concentrations of preservatives. Formulations containing juice concentrations as high as 10% may be preserved by this invention and certainly a beverage containing less than 10% juice would be preserved by this invention a beverage containing no more than 5% juice would be preserved by this invention. Any juice can be used to make the beverage of this invention. If a beverage concentrate is desired, the fruit juice is concentrated by conventional means from about 12° Brix to about 65° Brix. Beverage concentrates are usually 40° Brix or higher (about 40% to about 75% sugar solids).

Typically, beverages will possess a specified range of acidity. Acidity of a beverage is largely determined by the type of acidulant, its concentration, and the propensity of protons associated with the acid to dissociate away from the acid when the acid is entered into solution ($pk_A$). Any solution with a measurable pH between 0-14 possesses some, as reflected in the measurable or calculable concentration of free protons. However, those solutions with pH below 7 are generally understood to be acidic and those above pH 7 are understood to be basic. The acidulant can be organic or inorganic. A non-exclusive example of inorganic acids is phosphoric acids. Non-exclusive examples of organic acids are citric, malic, ascorbic, tartaric, lactic, gluconic, and succinic acids. Non-exclusive examples of inorganic acids are the phosphoric acid compounds and the mono- and di-potassium salts of these acids. (Mono- and di-potassium salts of phosphoric acid possess at least one proton that can contribute to acidity).

The various acids can be combined with salts of the same or different acids in order to manage pH or the buffer capacity of the beverage to a specified pH or range of pH. The invention can function at a pH as low as 2.6, but the invention will better function as the pH is increased from 2.6 up to pH 7.2. For high acidic beverages, the invention is not limited by the type of acidulant employed in acidifying the product. Virtually any organic acid salt can be used so long as it is edible and does not provide an off-flavor. The choice of salt or salt mixture will be determined by the solubility and the taste. Citrate, malate and ascorbate yield ingestible complexes whose flavors are judged to be quite acceptable, particularly in fruit juice beverages. Tartaric acid is acceptable, particularly in grape juice beverages, as is lactic acid. Longer-chain fatty acids may be used but can affect flavor and water solubility. For essentially all purposes, the malate, gluconate, citrate and ascorbate moieties suffice.

Certain exemplary embodiments of the beverage product of invention include sports (electrolyte balancing) beverages (carbonated or non-carbonated). Typical sport beverages contain water, sucrose syrup, glucose-fructose syrup, and natural or artificial flavors. These beverages can also contain sodium chloride, citric acid, sodium citrate, mono-potassium phosphate, as well as other natural or artificial substances which serve to replenish the balance of electrolytes lost during perspiration.

In certain exemplary embodiments, the present invention also includes beverage formulations supplemented with fat soluble vitamins. Non-exclusive examples of vitamins include fat-soluble vitamin E or its esters, vitamin A or its esters, vitamin K, and vitamin D3, especially vitamin E and vitamin E acetate. The form of the supplement can be powder, gel or liquid or a combination thereof. Fat-soluble vitamins may be added in a restorative amount, i.e. enough to replace vitamin naturally present in a beverage such as juice or milk, which may have been lost or inactivated during processing. Fat-soluble vitamins may also be added in a nutritionally supplemental amount, i.e. an amount of vitamin considered advisable for a child or adult to consume based on RDAs and other such standards, preferably from about one to three times the RDA (Recommended Daily Amount). Other vitamins which can be added to the beverages include vitamin B niacin, pantothenic acid, folic acid, vitamin D, vitamin E, vitamin B and thiamine. These vitamins can be added at levels from 10% to 300% RDA.

Supplements: The invention can be compromised by the presence of certain types of supplements but it is not an absolute and it will vary from beverage formulation to beverage formulation. The degree to which the invention is compromised will depend on the nature of the supplement and the resulting concentration of specific metal cations in the beverage as a consequence of the presence of the supplement. For example, calcium supplements can compromise the invention, but not to the same degree as chromium supplements. Calcium supplements may be added to the degree that a critical value total calcium concentration is not exceeded Calcium sources that are compatible with the invention include calcium organic acid complexes. Among the preferred calcium sources is "calcium citrate-malate", as described in U.S. Pat. No. 4,786,510 and U.S. Pat. No. 4,786,518 issued to Nakel et al. (1988) and U.S. Pat. No. 4,722,847 issued to Heckert (1988). Other calcium sources compatible with the invention include calcium acetate, calcium tartrate, calcium lactate, calcium malate, calcium citrate, calcium phosphate, calcium orotate, and mixtures thereof. Calcium chloride and calcium sulfate can also be included; however at higher levels they taste astringent.

Flavor Component: Beverage products according to the present invention can contain flavors of any type. The flavor component of the present invention contains flavors selected from artificial, natural flavors, botanical flavors fruit flavors and mixtures thereof. The term "botanical flavor" refers to flavors derived from parts of a plant other than the fruit; i.e. derived from bean, nuts, bark, roots and leaves. Also included within the term "botanical flavor" are synthetically prepared flavors made to simulate botanical flavors derived from natural sources. Examples of such flavors include cocoa, chocolate, vanilla, coffee, kola, tea, and the like. Botanical flavors can be derived from natural sources such as essential oils and extracts, or can be synthetically prepared. The term "fruit flavors" refers to those flavors derived from the edible reproductive part of a seed plant, especially one having a sweet pulp associated with the seed. Also included within the term "fruit flavor" are synthetically prepared flavors made to simulate fruit flavors derived from natural sources.

Artificial flavors can also be employed. Non-exclusive examples of artificial flavors include chocolate, strawberry, vanilla, cola, or artificial flavors that mimic a natural flavor can be used to formulate a still or carbonated beverage flavored to taste like fruit. The particular amount of the flavor component effective for imparting flavor characteristics to the beverage mixes of the present invention ("flavor enhancing") can depend upon the flavor(s) selected, the flavor impression desired, and the form of the flavor component. The flavor component can comprise at least 0.005% by weight of the beverage com position.

On a case by case basis, the beverage preservative system according to the present invention is compatible with beverages formulated to contain aqueous essence. As used herein, the term "aqueous essence" refers to the water soluble aroma and flavor materials which are derived from fruit juices. Aqueous essences can be fractionated, concentrated or folded essences, or enriched with added components. As used herein, the term "essence oil" refers to the oil or water insoluble fraction of the aroma and flavor volatiles obtained from juices. Orange essence oil is the oily fraction which separates from the aqueous essence obtained by evaporation of orange juice. Essence oil can be fractionated, concentrated or enriched. As used herein, the term "peel oil" refers to the aroma and flavor derived from oranges and other citrus fruit and is largely composed of terpene hydrocarbons, e.g. aliphatic aldehydes and ketones, oxygenated terpenes and sesquiterpenes. From about 0.002% to about 1.0% of aqueous essence and essence oil are used in citrus flavored juices.

Sweetener Component: The microbiological preservation function of the present invention in single strength beverage formulation is not affected by the type of sweeteners present in the beverage. The sweetener may be any sweetener commonly employed for use in beverages. Sweeteners suitable for use in various embodiments of the beverages disclosed here include nutritive and non-nutritive, natural and artificial or synthetic sweeteners. The sweetener can include a monosaccharide or a disaccharide. A certain degree of purity from contamination by metal cations will be expected. Peptides possessing sweet taste are also permitted. The most commonly employed saccharides include sucrose, fructose, dextrose, maltose and lactose and invert sugar. Mixtures of these sugars can be used. Other natural carbohydrates can be used if less or more sweetness is desired. Suitable non-nutritive sweeteners and combinations of such sweeteners are selected for the desired nutritional characteristics, taste profile for the beverage, mouthfeel and other organoleptic factors. Non-nutritive artificial sweeteners suitable for at least certain exemplary embodiments include, for example, peptide based sweeteners, e.g., aspartame, neotame, and alitame, and non-peptide based sweeteners, for example, sodium saccharin, calcium saccharin, acesulfame potassium, sodium cyclamate, calcium cyclamate, neohesperidin dihydrochalcone, and sucralose. In certain exemplary embodiments the beverage product employs aspartame as the sweetener, either alone or with other sweeteners. In certain other exemplary embodiments the sweetener comprises aspartame and acesulfame potassium. Other non-nutritive sweeteners suitable for at least certain exemplary embodiments include, for example, sorbitol, mannitol, xylitol, glycyrrhizin, D-tagatose, erythritol, meso-erythritol, malitol, maltose, lactose, fructo-oligosaccharides, Lo Han Guo powder, mogroside V, glycyrrhizin, steviol glycosides, e.g., rebaudioside A, rebaudioside B, rebaudioside C, rebaudioside D, rebaudioside E, steviolbioside, stevioside, dulcoside A etc., *Stevia rebaudiana* extract, acesulfame, aspartame, other dipeptides, cyclamate, sucralose, saccharin, xylose, arabinose, isomalt, lactitol, maltitol, trehalose, ribose, monatin, and protein sweeteners such as thaumatin, monellin, brazzein, D-alanine, and glycine, related compounds, and mixtures of any of them. It will be within the ability of those skilled in the art, given the benefit of this disclosure, to select suitable non-nutritive and nutritive sweeteners and combinations thereof. The amount of the sweetener effective in the beverage mixes of the invention depends upon the particular sweetener used and the sweetness intensity desired.

Head space atmosphere: The presence of air in the headspace of the beverage product will have no measurable impact on the composition of the invention. The presence of carbon dioxide gas or other gases that cause the exclusion of oxygen from the beverage (nitrogen, nitrous oxide, etc) may permit the use of reduced concentrations of chemical preservatives employed along with the sequestrants. The concentration of sequestrants required will be dictated only by the type and amount of metal cations that are present in the beverage product.

The following examples are specific embodiments of the present invention, but are not intended to limit it.

EXAMPLE 1

Pimaricin exhibits a solubility limit in water of about 52 mg/L according to reports in the literature. Typically, organic acids are less soluble at lower pH, reflecting the impact of the protonation of various carboxylic acid groups. The presence of a carboxylic group at carbon 24 in the carbon backbone of Pimaricin should, predictably, lower the solubility of Pimaricin still further when Pimaricin is present in an acid environment. These facts are consistent with our finding that the solubility limit of Pimaricin in aqueous based high acid beverage is about 20 mg/L at ambient temperature (25° C.) and 10 mg/L in the same beverage at 4° C. The following example provides an illustration of the inability to Pimaricin to prohibit spoilage when the concentration of Pimaricin is restricted to its natural limit of solubility (stand-alone concentration).

A 2% fruit juice based non-carbonated beverage of pH 3.4 and about 12 Brix was formed by combining the following ingredients.

| | |
|---|---|
| Added Water | Approximately 84% water |
| Apple Juice Concentrate | About 0.372% to provide single strength concentration of about 2% |
| Sucrose | 6.8% |
| Glucose | 5.2% |
| Fructose | 0.2% |
| Pimaricin | 0.002% (final concentration, 20 mg/L) |
| Malic acid | 0.134% |
| Sodium Malate | 0.013% (approximately, adjusting pH to 3.4) |
| $CaCl_2$—$2H_2O$ | 0.011% |
| $MgCl_2$—$6H_2O$ | 0.003% |

The preparation of beverage was divided into two aliquots. To one aliquot was added Pimaricin (0.003% or 30 mg/L). The preparation containing Pimaricin was stirred for 24 hours at room temperature to ensure maximum solubility of Pimaricin. Following the preparation was filtered through a 0.22 micron filter in order to remove the fraction of Pimaricin that did not enter solution. The final concentration of Pimaricin was established spectrophotometrically at 20.0 mg/L.

The aliquot of beverage containing Pimaricin and the preparation of beverage lacking Pimaricin, (also filter sterilized) were mixed in different ratios such that a range of Pimaricin concentrations was achieved ranging from 0 to 20.0 mg/L. Each of 24 such preparations was then divided equally across 8 separate tubes making for 192 samples.

Spores from each of 7 different mold species were then inoculated separately into tubes containing beverage such that each mold would be challenged to grow over the full concentration range of Pimaricin. At each concentration of Pimaricin the 8$^{th}$ tube of a set served as a negative control. The tubes were sealed in a manner that prohibits moisture evaporation. Samples were then incubated at 25° C. for a period of 16 weeks or until all test samples exhibited visual evidence of mold growth.

The mold spores employed were obtained from the following organisms. *Aspergillus niger* isolate of Pepsi; ATCC strain 90900 (*Talaromyces spectabilis*), ATCC strain 48441 (*Pencillium galbrum*), ATCC 24088 (*Byssochlamys fulva*), ATCC 96468 (*Neosartorya fischeri*) ATCC strain 96463 (*Talaromyces flavus*) and ATCC strain ATCC 10512 (*Talaromyces flavus* var. *flavus*). Each spore type was present at 20 spores per milliliter.

As evident in Table 1, the majority of mold (>50%) were able to grow at the highest concentration of Pimaricin present in solution. The results suggest that Pimaricin at its natural limit of solubility demonstrates a rather narrow spectrum of activity. Here, the term "spectrum" refers to the range of organisms which exhibit sensitivity to Pimaricin. Rarely does a narrow spectrum antimicrobial find use as a food or beverage preservative. Typically, antimicrobial compounds need to be relatively broad spectrum in their activity in order to be effective as a food or beverage preservative.

Consequently, the results of the study depicted in Table 1 are not supportive of the use of Pimaricin as a stand alone preservative for still beverages. Note ppm is equivalent to mg/L.

TABLE 1

| MIC for un-complexed PIMARICIN | | | | |
| --- | --- | --- | --- | --- |
| Organism | Strain | Spore Generation | T(C. °) for generation of spores | 16 week incubation MIC (ppm) |
| *Aspergillus* | Pepsi Isolate | Potato Dextrose | 25 | 18.4 |
| *Talaromyces spectabilis* | ATCC 90900 | Potato Dextrose | 25 | 10.3 |
| *Penicillium glabrum* | ATCC 48441 | Potato Dextrose | 25 | 5.7 |
| *Byssochlamys fulva* | ATCC 10099 | Potato Dextrose | 25 | 16.9 |
| *Neosartorya fischeri* | ATCC 96468 | Potato Dextrose | 25 | >20 |
| *Tataromyces flavus* | ATCC 96463 | Potato Dextrose | 25 | >20 |
| *Talaromyces flavus* var *flavus* | ATCC 10512 | Potato Dextrose | 25 | >20 |

EXAMPLE 2

As offered in Example 1, Pimaricin exhibits a solubility limit in water of about 20 mg/L at ambient temperature (25° C.) and 10 mg/L in the same beverage at 4° C. in a high acid beverage of pH 3.4. If it were possible to enhance the solubility of Pimaricin, it is likely that Pimaricin would inhibit a broader range of spoilage organisms. In other word, the spectrum of Pimaricin could be extended if the solubility of Pimaricin in solution can be extended. The following example provides an illustration of a broader spectrum of efficacy of Pimaricin when present in solution beyond the normal limit of aqueous phase solubility. The increased concentration of Pimaricin is accomplished through the use of Dimethyl Sulfoxide (DMSO). DMSO is frequently employed as a solvent to bridge solubility of substances into water. Further, DMSO is not measurably toxic to yeast and mold fungi. It is generally understood that fungi can tolerate at least 5% DMSO without suffering deleterious effects.

A 2% fruit juice based non-carbonated beverage of pH 3.4 and about 12 Brix was formed by combining the following ingredients.

| | |
| --- | --- |
| Added Water | Approximately 84% water |
| Apple Juice Concentrate | About 0.372% to provide single strength concentration of about 2% |
| Sucrose | 6.8% |
| Glucose | 5.2% |
| Fructose | 0.2% |
| Pimaricin-βCD | 0-0.0072% pimaricin (maximum final concentration) |
| Malic acid | 0.134% |
| Sodium Malate | 0.013% (approximately, adjusting pH to 3.4) |
| $CaCl_2$—$2H_2O$ | 0.011% |
| $MgCl_2$—$6H_2O$ | 0.003% |
| Dimethyl Sulfoxide | 5% |

The preparation of beverage was divided into two aliquots. One of two aliquots was made to contain 72 mg/L Pimaricin (0.00072%) by way of inclusion of DMSO. Establishing the concentration of pimaricin in solution is readily achieved by means of UV-spectrophotometry.

The second aliquot of beverage is identical to the first aliquot except for the presence of pimaricin. It also contains 5% DMSO. The aliquot of beverage containing Pimaricin and the preparation of beverage lacking Pimaricin (also filter sterilized) were mixed in different ratios such that a range of Pimaricin concentrations was achieved ranging from 0 to 72.0 mg/L. Each of 36 such preparations was then divided equally across 8 separate tubes making for 288 samples. Spores from each of 7 different mold species were then inoculated separately into tubes containing beverage such that each mold would be challenged to grow over the full concentration range of Pimaricin. At each concentration of Pimaricin the 8$^{th}$ tube of a set served as a negative control. The tubes were sealed in a manner that prohibits moisture evaporation. Samples were then incubated at 25° C. for a period of 16 weeks or until all test samples exhibited visual evidence of mold growth.

The results depicted in Table 2 demonstrate that many molds are tolerant to Pimaricin at concentrations well in excess of the natural limit of Pimaricin solubility of 52 mg/L (ppm) in water. The pH of high acid beverages serves to reduce the solubility of Pimaricin to around 20 mg/L (ppm) at 25° C. When high acid beverages are refrigerated, the solubility of Pimaricin is no greater than 10 mg/L (ppm).

TABLE 2

GROWTH INHIBITORY EFFECT OF PIMARICIN MEDIUM CONTAINING 5% DMSO

| Organism | Strain | Medium employed to generate spores | Spore Development Temp C. ° | Observed MIC (ppm) (16 week) |
|---|---|---|---|---|
| Zygosaccharomyces bisporus | ATCC 52407 | PDA | 25 | 2.5 |
| Zygosaccharomyces bailli | ATCC 60484 | PDA | 25 | 2.5 |
| Saccharomyces cerevisiae | Pepsi Isolate | PDA | 25 | 2.5 |
| Brettanomyces | Pepsi Isolate | PDA | 25 | 2.5 |
| Zygosaccharomyces bailli | Pepsi Isolate | PDA | 25 | 2.5 |
| Paecilomyces variotii | Pepsi Isolate | PDA | 25 | 58.3 |
| Penicillium camembertii | Pepsi Isolate | PDA | 25 | 6.4 |
| Talaromyces flavus var. flavus | ATCC 10512 | PDA | 25 | 72 |
| Byssochlamys nieva | ATCC 36614 | PDA | 25 | 46 |
| Byssochlamys fulva | ATCC 10099 | PDA | 25 | 2 |
| Talaromyces flavus var. flavus | ATCC 10512 | PDA | 25 | >72 |
| Byssochlamys fulva | ATCC 10099 | MEA | 30 | 7.9 |
| Penicillium camembertii | Pepsi Isolate | MEA | 30 | 65 |
| Paecilomyces variotii | Pepsi Isolate | MEA | 30 | >72 |

Yeast employed in the study are *Zygosaccharomyces bisporus* (ATCC 52407) *Zygosaccharomyces bailii* (ATCC 60484), *Saccharomyces cerevisiae* (Pepsi Isolate Y99), *Brettanomyces* (Pepsi Isolate Chemy 7UP), and *Zygosaccharomyces* (Pepsi Isolate Y2).

The mold spores employed were obtained from the following organisms *Paecilomyces variotii* (Pepsi isolate D16), *Penicillium camembertii* (Pepsi isolate M3), (*Talaromyces flavus* var. *flavus* (ATCC 10512), *Byssochlamys nieva* (ATCC 36614), and *Byssochlamys fulva* ATCC 10099). Each spore type was present initially at 20 spores per milliliter of product. Spores for a couple of strains of mold (such as *Byssochlamys nieva*) were developed at both 25° C. on Potato Dextrose and 30° C. on Malt Extract in order to ensure some variation in the ratio of asci (ascospores) to conidiospores.

It is relevant to note that the difference in tolerance to Pimaricin among fungal strains is not particularly surprising. Pimaricin is classified as a polyene antimycotic and a number of pathogenic mold species have been reported as tolerant or resistant to polyene antifungal substances that are commonly employed in medical applications (Amphotericin B). Apparently, some fungal organisms are able to reduce the amount of ergosterol that is present in the membrane when confronted with Pimaricin or similarly structured polyenes. In so doing, the organism reduces the opportunity for Pimaricin to interact or bind to ergosterol; a necessary first step in the mode of action (MOA) for pimaricin. Such a mechanism is not resistance but is instead tolerance in that the genes required for tolerance are not readily transmitted across species or genus.

As evident in Table 2, the nearly 50% of bio-indicator species and 6 of 9 mold species bio-indicators were able to grow at concentrations of Pimaricin greater than the limit of natural solubility of Pimaricin in beverage (20 mg/L). At the same time, the results clearly indicate that Pimaricin alone, when present at concentrations in excess of 70 mg/L, can be adequate to allow commercial production of many beverage products. In many instances, concentrations as low as 50 to 100 mg/L pimaricin might suffice if the shelf life expectation is measured in days versus weeks as will be the case for certain fountain formulations. Additionally, the presence of 50 mg/L Pimaricin can be supplemented with other antimicrobial agents that are at least function in additive manner to allow production of products that require 16 week shelf life. However, nearly all product-type is exposed to refrigeration temperatures during distribution, storage or display, so Pimaricin at a concentration above 10-15 mg/L will result in precipitation of Pimaricin unless the solubility issue can be addressed. Any substance that might be employed to enhance the solubility of Pimaricin must not interfere with the antimicrobial activity of Pimaricin. Even for those practiced in the art, it likely is difficult to conceive of an chemical structure arrangement inclusive of Pimaricin that both enhances solubility and does not interfere with the biochemical interaction of Pimaricin with the target organisms.

EXAMPLE 3

Described below is an apple juice based product formulated to contain Pimaricin complexed with Povidone. In this particular instance, the form of Povidone has a molecular weight value of 28,000 to 34,000.

| | |
|---|---|
| Added Water | Approximately 84% water |
| Apple Juice Concentrate | About 0.372% to provide single strength concentration of about 2% |
| Sucrose | 6.8% |
| Glucose | 5.2% |
| Fructose | 0.2% |
| Pimaricin-PVP complex | 0.008% Pimaricin (max. final concentration) |
| Malic acid | 0.134% |
| Sodium Malate | 0.013% (approximately, adjusting pH to 3.4) |
| $CaCl_2$—$2H_2O$ | 0.011% |
| $MgCl_2$—$6H_2O$ | 0.003% |
| EDTA | 0.003% |

The fact that one or more bio-indicator mold demonstrated tolerance to Pimaricin over a period of 16 weeks does not exclude the possibility of employing Pimaricin as a standalone preservative. However, it may be more beneficial to employ PVP-Pimaricin complex in combination with other antimicrobial substances. The product formulation of Example 3 incorporates PVP-Pimaricin complex such that the final concentration of Pimaricin is 80 mg/L. The additional supplement of 30 mg/L EDTA (0.003%) provides additional protection against spoilage from mold fungi. Given the relative heat stability of Pimaricin (melting temperature of Pimaricin=>180° C. and melt temperature of Povidone=110° C.) such a formulation can be either processed by hot-fill (70-85° C. for 2 minutes) or tunnel pasteurized wherein either thermal processes provide still further protection against spoilage. The thermal process (time×temperature) need not be as extreme as in the instance where the Pimaricin-PVP complex is absent.

EXAMPLE 4

A beverage tea formulation is prepared with a pH value of 4.2 (per liter).

| Water | 91.06 g |
|---|---|
| Tea solid | 0.22 g |
| Carbohydrate | 8.81 g |
| Fructose | 0.5 g |
| Pectin | 0.165 g |
| Rebaudioside A | .2 g |
| Lemon Flavor | 2.0 g |
| Succinic acid | .5 g |
| Na + Succinate | 0.1 g |
| Calcium, Ca | 1 mg |
| Iron, Fe | .001 |
| Magnesium, Mg | 0 mg |
| Phosphorus, P | 26 mg |
| Potassium, K | 19 mg |
| Sodium, Na | 21 mg |
| Zinc, Zn | .01 mg |
| Copper, Cu | .005 mg |
| Manganese, Mn | 0.146 mg |
| Caffeine | 2 mg |
| EDTA | 30 mg |
| SHMP | 500 mg/L |
| Cinnamic acid | 30 mg |
| Pimaricin-Povidone complex | 100 mg/L Pimaricin & Povidone (MW 44-54K) |

At this pH, it is possible to obtain a concentration of at least 120-140 mg/L Pimaricin through the formation of a complex formed with Povidone. In combination with a small amount of Cinnamic acid (30 mg/L) the beverage is adequately stable against spoilage. Addition of 30 mg/L EDTA and 500 mg/L SHMP serves further toward microbial stabilization of the tea beverage for a period in excess of 16 weeks. Herein, the form of Povidone employed is MW range 44,000 to 54,000. A commercial source of this form of Povidone is Kollidon 30™.

EXAMPLE 5

Sport drinks and other health related formulations can benefit measurably from the complex of Povidone-Pimaricin. Shown is the formulation for a water based beverage that contains nutrients and a natural low calorie sweetener (Rebaudioside A). The pH of this beverage is 3.9. The low sugar content of the beverage and relatively high pH permits the use of Pimaricin-Povidone complex at 100 grams of complex per liter (250 mg/L Pimaricin).

| Ingredient | % |
|---|---|
| Water | 99.58 |
| Rebaudioside A | 0.021 |
| K + Citrate | 0.025 |
| NutraBlend/Flavor vitamin | 0.025 |
| Calcium Lactate | 0.025 |
| Flavor (grape) | 0.025 |
| Xanthan Gum | 0.030 |
| Citric Acid Anhydrous | 0.067 |
| Color | 0.100 |
| Yumberry Pomegr Flavor | 0.100 |
| Erythritol | 2.490 |
| EDDS | 0.003% |
| Pimaricin-PVP complex | 0.25% Pimaricin |

Unlike other types of compounds that can be made into a complex with Pimaricin, Povidone will not add any measurable number of calories. The formulation shown can be employed as a healthy for you water beverage. EDDS is ethylene diamine disuccinic acid and can substitute for EDTA in many applications. EDDS can be obtained commercially as a synthetic compound but natural sources of this compound have been identified. The form of Povidone employed in this formulation is the high molecular weight form (1,000,000 to 1,500,000 daltons). A commercially available form of this type of Povidone is Kollion 90F™. In this particular formulation, Pimaricin is the only substance that must be recognized as a true preservative and for all extent and purposes, the beverage is preserved solely with 100 mg/L Pimaricin.

Given the benefit of the above disclosure and the description of certain exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A beverage comprising:
    a beverage component and a beverage preservative system comprising a pimaricin-povidone complex;
    wherein the beverage has a pH of 2.5 to 4.6; and the beverage preservative system prevents spoilage by microorganisms in a beverage within a sealed container for a period of at least 16 weeks.

2. The beverage of claim 1 wherein the pimaricin is present in the beverage in an amount of at least about 25 mg/L and to about 250 mg/L.

3. The beverage of claim 2 wherein the pimaricin is present in the beverage in an amount of at least about 50 mg/L and to about 200 mg/L.

4. The beverage of claim 3 wherein the pimaricin is present in the beverage in an amount of at least about 75 mg/L and to about 150 mg/L.

5. The beverage of claim 1 further comprising dimethyl dicarbonate.

6. The beverage of claim 5 wherein the dimethyl dicarbonate is present in the beverage in an initial concentration in the range of about 75 mg/L to about 250 mg/L.

7. The beverage of claim 6 wherein the dimethyl dicarbonate is present in the beverage in an initial concentration of about 100 mg/L to about 250 mg/L.

8. The beverage of claim 1 further comprising a sequestrant.

9. The beverage of claim 8 wherein the sequestrant is EDTA or EDDS.

10. The beverage of claim 1 wherein the beverage component comprises at least one selected from the group consisting of water, a juice, a flavorant, a sweetener, an acidulant, a colorant, a vitamin, a buffering agent, a thickener, an emulsifier, and an anti-foaming agent.

11. The beverage of claim 1 wherein the juice is a fruit juice selected from the group consisting at least one of orange, grapefruit, lemon, lime, tangerine, apple, grape, cranberry, raspberry, blueberry, strawberry, pineapple, pear, peach, pomegranate, prune, cherry, mango, papaya, lychee, and guava.

12. The beverage of claim 1 wherein the beverage is a carbonated beverage, a non-carbonated beverage, a soft drink, a fruit juice, a fruit juice flavored drink, a fruit-flavored drink, an energy drink, a hydration drink, a sport drink, a health and wellness drink, a fountain beverage, a frozen ready-to-drink beverage, a frozen carbonated beverage, a liquid concentrate, a coffee beverage, a tea beverage, a dairy beverage, a soy beverage, a vegetable drink, a flavored water, an enhanced water, or an alcoholic beverage.

13. The beverage of claim 1 further comprising at least one polyphosphate or diphosphonic acid.

14. A method of forming a beverage comprising:
   forming a beverage preservative system comprising a pimaricin-povidone complex;
   adding the beverage preservative system to a beverage;
   sealing the beverage in a container to produce a sealed beverage;
   wherein the sealed beverage has a pH of 2.5 to 4.6; and
   wherein the beverage preservative system is preventing spoilage by microorganisms in the sealed beverage for a period of at least 16 weeks.

* * * * *

UNITED STATES PATENT AND TRADEMARK OFFICE
CERTIFICATE OF CORRECTION

| | | |
|---|---|---|
| PATENT NO. | : 8,435,582 B2 | Page 1 of 1 |
| APPLICATION NO. | : 12/791912 | |
| DATED | : May 7, 2013 | |
| INVENTOR(S) | : Richard T. Smith | |

It is certified that error appears in the above-identified patent and that said Letters Patent is hereby corrected as shown below:

In the Claims

Column 20, Claim 11, Line 66:
Please delete "beverage of claim 1" to --beverage of claim 10--

Signed and Sealed this
Thirtieth Day of September, 2014

Michelle K. Lee
*Deputy Director of the United States Patent and Trademark Office*